(12) United States Patent
Hsu et al.

(10) Patent No.: US 11,955,794 B2
(45) Date of Patent: Apr. 9, 2024

(54) SURGE PROTECTION SYSTEM

(71) Applicant: POWERTECH INDUSTRIAL CO., LTD., New Taipei (TW)

(72) Inventors: Jung-Hui Hsu, New Taipei (TW); Po-Hua Hsu, New Taipei (TW); Chi-Chien Chen, New Taipei (TW)

(73) Assignee: POWERTECH INDUSTRIAL CO., LTD., New Taipei (TW)

( * ) Notice: Subject to any disclaimer, the term of this patent is extended or adjusted under 35 U.S.C. 154(b) by 142 days.

(21) Appl. No.: 17/824,847

(22) Filed: May 25, 2022

(65) Prior Publication Data

US 2023/0085333 A1 Mar. 16, 2023

(30) Foreign Application Priority Data

Sep. 16, 2021 (TW) .................. 110210979

(51) Int. Cl.
*H02H 9/04* (2006.01)
*H02H 1/00* (2006.01)
*H02H 5/04* (2006.01)

(52) U.S. Cl.
CPC .......... *H02H 9/042* (2013.01); *H02H 1/0092* (2013.01); *H02H 5/04* (2013.01)

(58) Field of Classification Search
CPC .............................. H02H 9/042; H01R 13/514
See application file for complete search history.

(56) References Cited

U.S. PATENT DOCUMENTS

| 9,875,830 | B1* | 1/2018 | Gattis | .................... H01C 7/126 |
| 2007/0097584 | A1* | 5/2007 | Ducharme | .......... H05K 1/0257 361/118 |
| 2009/0207034 | A1* | 8/2009 | Tinaphong | ............. H02H 9/042 340/635 |

* cited by examiner

*Primary Examiner* — Jared Fureman
*Assistant Examiner* — Christopher J Clark
(74) *Attorney, Agent, or Firm* — Li & Cai Intellectual Property Office (57) ABSTRACT

A surge protection system includes a receptacle body, at least one power output jack, a power obtaining device, at least one surge protection module, a microcontroller unit, and a surge detection circuit. The at least one surge protection module includes a housing, a memory element, and a surge protection circuit that includes a surge absorption element and a thermal fuse connected in series and parallel. The surge absorption element absorbs a surge inputted from an external power supply, and the memory element records a number of surges carried by the surge absorption element. When the surge enters the surge protection system from the external power supply, the surge absorption element absorbs the surge, and the surge detection circuit outputs a signal to the microcontroller unit that writes the number of surges carried by the surge absorption element into the memory element.

13 Claims, 12 Drawing Sheets

SURGE PROTECTION SYSTEM

CROSS-REFERENCE TO RELATED PATENT APPLICATION

This application claims the benefit of priority to Taiwan Patent Application No. 110210979, filed on Sep. 16, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a surge protection system, and more particularly to a surge protection system having a surge protection function.

BACKGROUND OF THE DISCLOSURE

In modern life, the number of electrical appliances used in each family increases continually. Since the number of sockets disposed on a wall in indoor space is limited, increasing the number of available sockets by connecting multi-hole extension sockets to sockets on the wall has become the norm. Currently, there is a surge protection element inside each multi-hole extension socket to prevent surges from flowing into the socket. A surge is a transient and instantaneous current and voltage fluctuation. For example, when a lightning strike falls near a building or when other special circumstances occur, the surge can enter the multi-hole extension socket, and various electronic elements connected to the multi-hole extension socket are damaged due to the surge.

However, the number of surges that the surge protection element in the multi-hole extension socket can carry is limited, which means that the surge protection element itself has a limited service life or can be damaged due to other reasons. In the related art, once the surge protection element in the multi-hole extension socket is damaged, the whole set of sockets can only be discarded and replaced with a new one. That is, the surge protection element cannot be separately replaced, which is not cost-effective for users.

In addition, in the related art, even though the surge protection element is designed as a replaceable element, the surge protection element itself does not provide any early warning function to warn the users, so the users have to wait until the surge protection element fails to know that the surge protection element needs to be replaced. Therefore, since the user cannot be warned in advance, the user may continue to use the extension socket under the false impression that the surge protection element is still normal, which may lead to safety risks.

Therefore, how to overcome the above-mentioned deficiencies through an improvement in structural design has become one of the important issues to be solved in this field.

SUMMARY OF THE DISCLOSURE

In response to the above-referenced technical inadequacies, the present disclosure provides a surge protection system.

In one aspect, the present disclosure provides a surge protection system, which includes a receptacle body, a power obtaining device, at least one surge protection module, and a microcontroller unit. The receptacle body is provided with at least one accommodating chamber. The power obtaining device is disposed on the receptacle body and connected to an electrical power. The at least one surge protection module is detachably disposed in the at least one accommodating chamber and electrically connected to the power obtaining device. The at least one surge protection module includes a housing, a memory element, a surge protection circuit, a display element, a signal terminal set, and a power terminal set. The memory element is disposed in the housing, and the memory element stores identification information of the at least one surge protection module. The surge protection circuit is disposed in the housing, and includes a surge absorption element and a thermal fuse. The surge absorption element is electrically connected in series to the thermal fuse. The surge absorption element is configured to absorb a surge inputted from an external power supply through the power obtaining device, and the surge absorption element absorbs the surge to generate a temperature rise. When the temperature rise exceeds a temperature tolerance range of the thermal fuse, the thermal fuse is blown, so that the surge protection circuit forms an open circuit. The display element is electrically connected to the surge absorption element, and the display element is configured to display whether the surge absorption element is in an operational status or a failed status. The signal terminal set is electrically coupled to the memory element and exposed from the housing. The power terminal set is electrically coupled to the surge absorption element and exposed from the housing. The microcontroller unit is disposed in the receptacle body, and the microcontroller unit is electrically connected to the memory element and the surge protection circuit.

Therefore, in the surge protection system provided by the present disclosure, through the technical features of "the at least one surge protection module is detachably disposed in the at least one accommodating chamber and electrically connected to the power obtaining device," "the memory element stores identification information of the at least one surge protection module," and "the display element is electrically connected to the surge absorption element, and the display element is configured to display whether the surge absorption element is in an operational status or a failed status," the surge protection module can be used as an independent element that can be separated from the surge protection system, and can be replaced separately when the surge protection module is damaged.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 1:
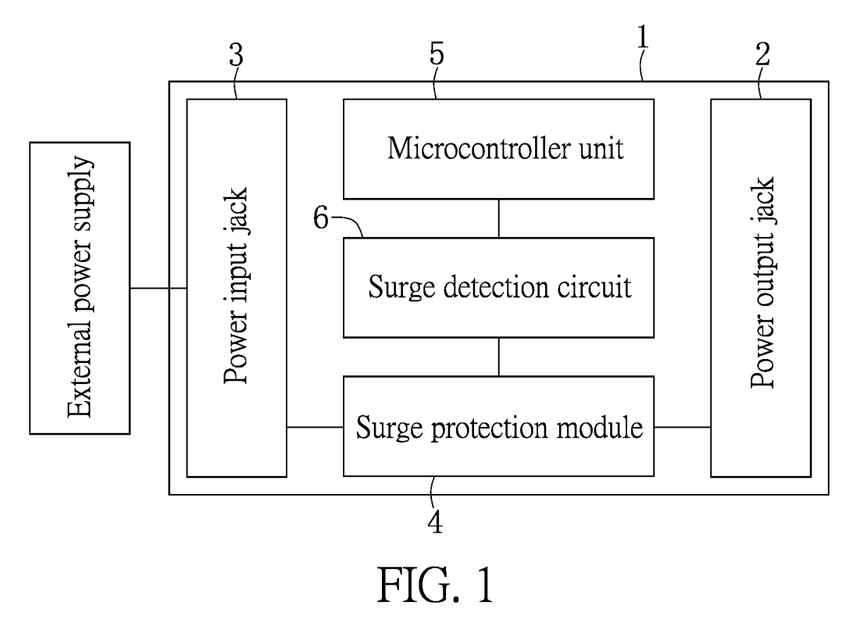
FIG. 1 is a functional block diagram of a surge protection system according to the present disclosure.
Figure 3:
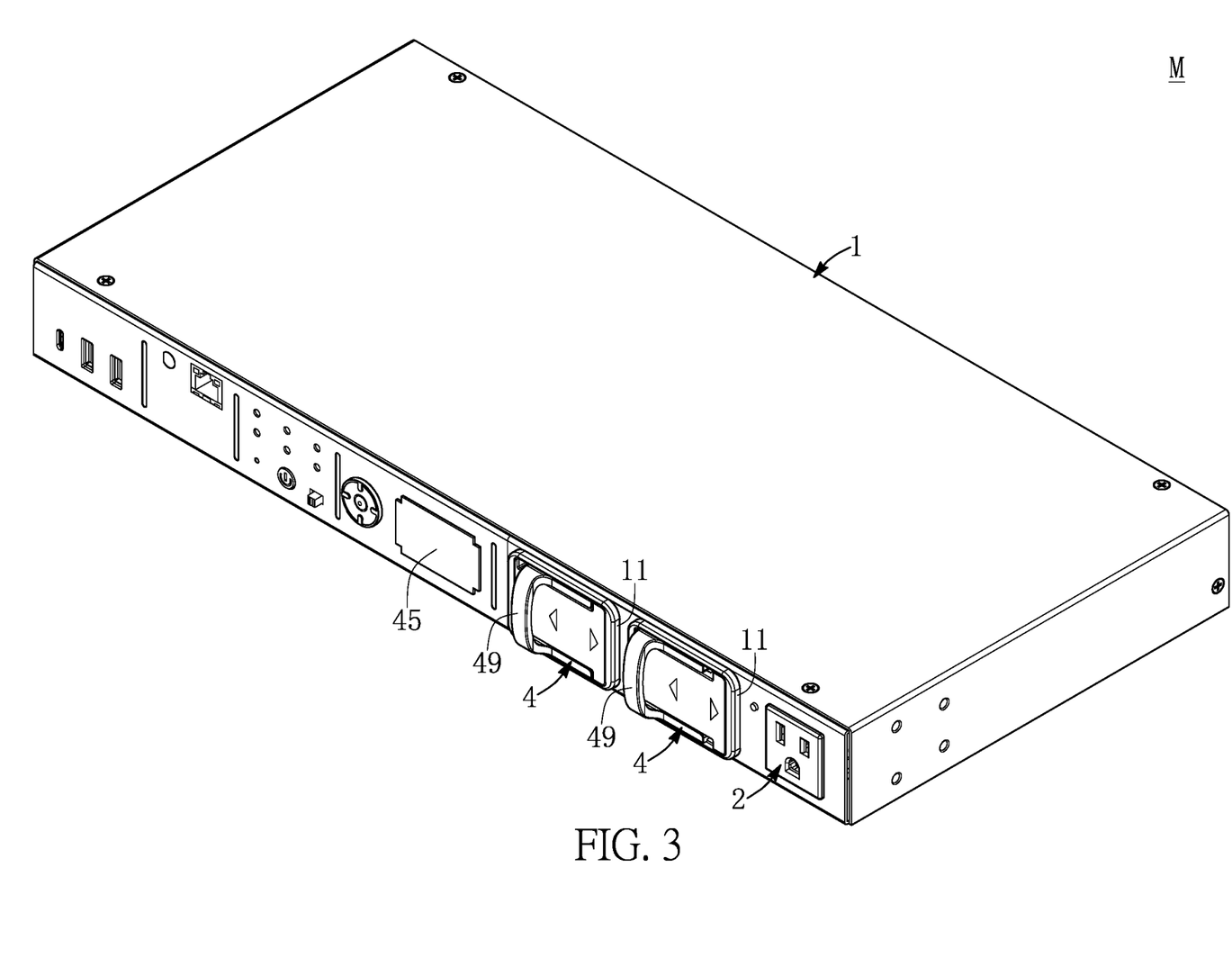
FIG. 3 is a schematic perspective view of a surge protection system according to a first embodiment of the present disclosure.
Figure 4:
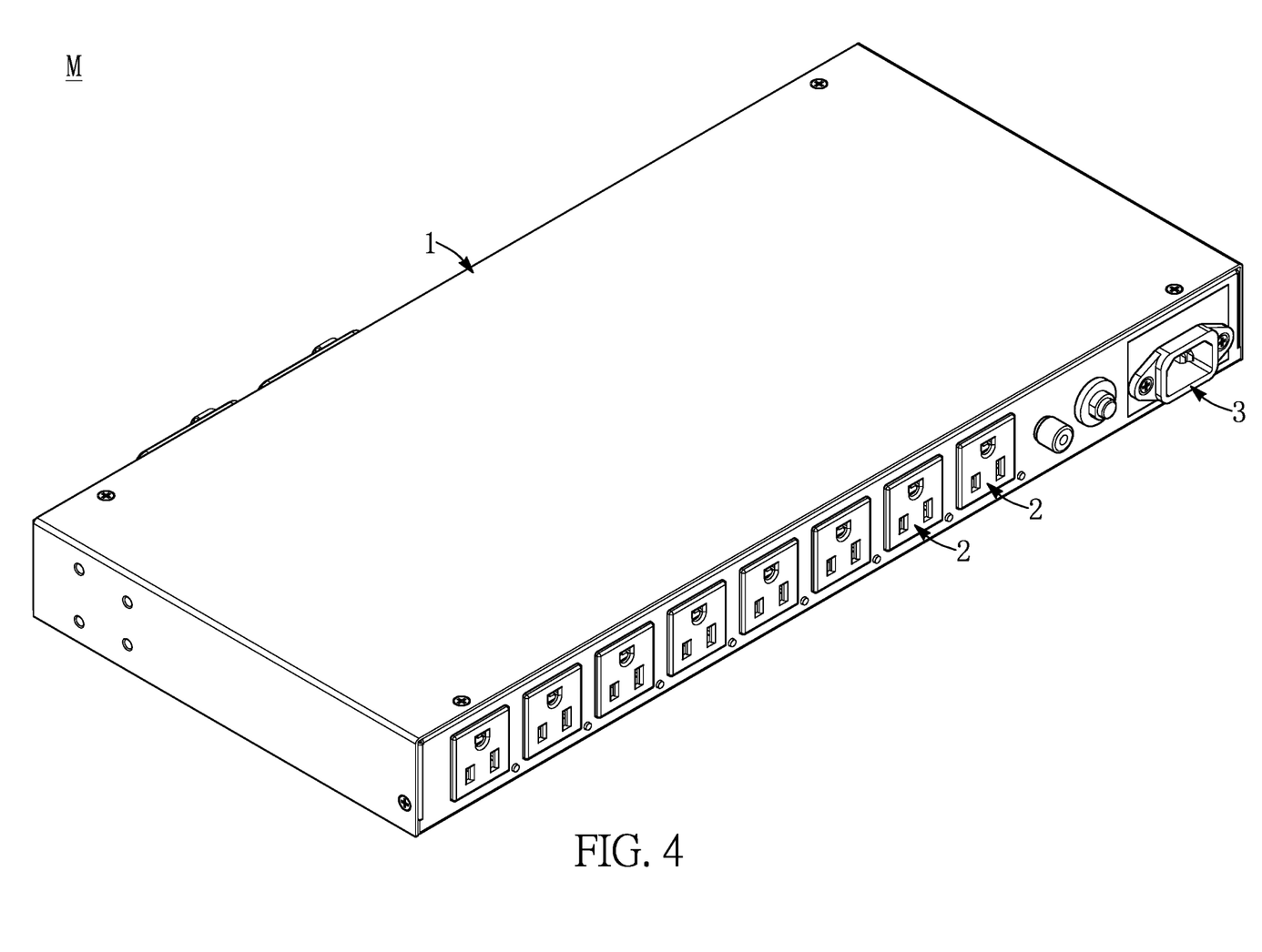
FIG. 4 is another schematic perspective view of the surge protection system according to the first embodiment of the present disclosure.
Figure 5:
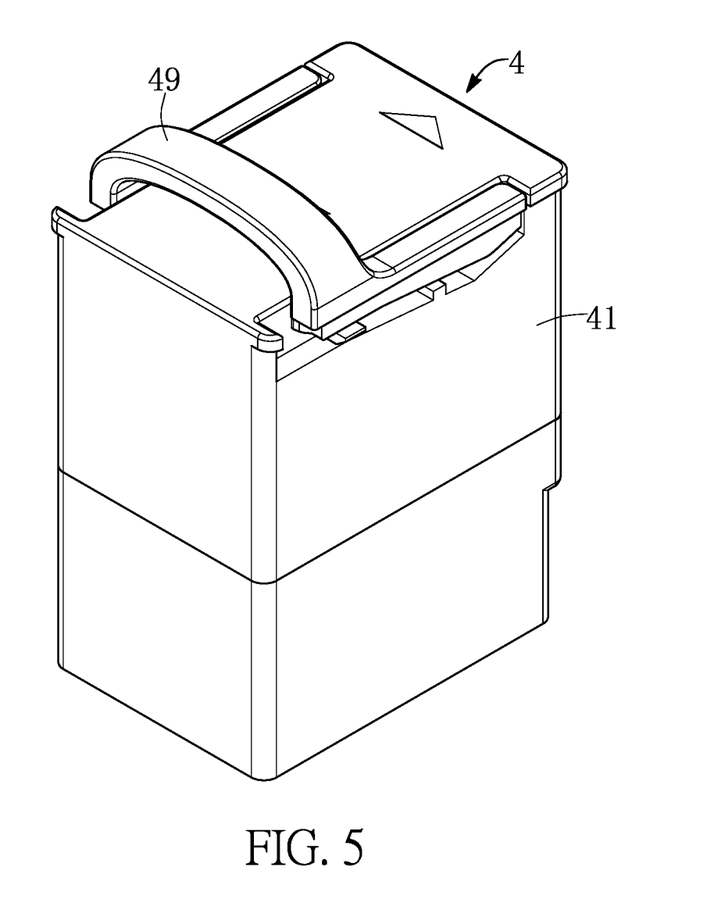
FIG. 5 is a schematic perspective view of a surge protection module of a surge protection system according to a second embodiment of the present disclosure.
Figure 6:
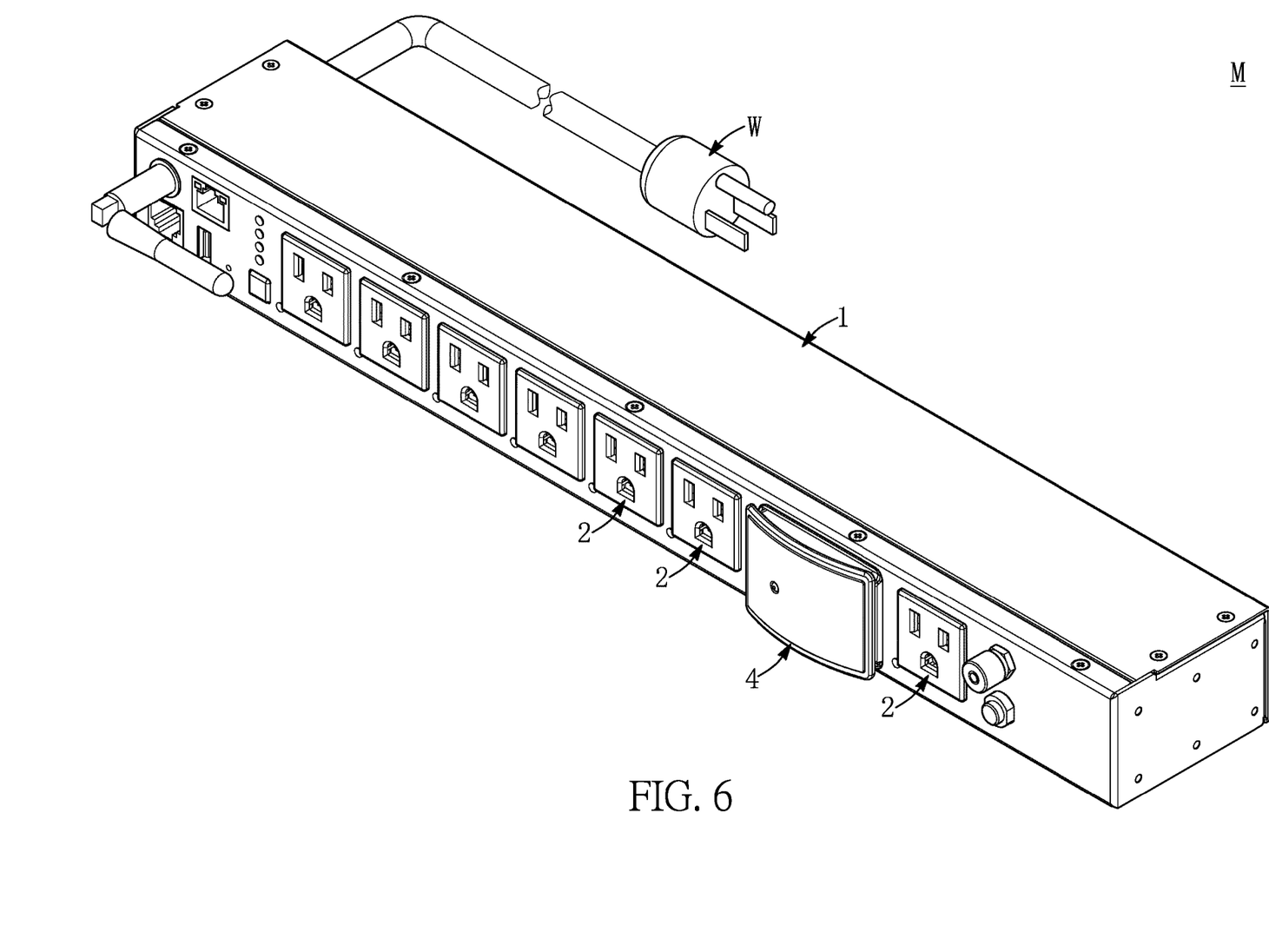
FIG. 6 is a schematic perspective view of the surge protection system according to the second embodiment of the present disclosure.
Figure 7:
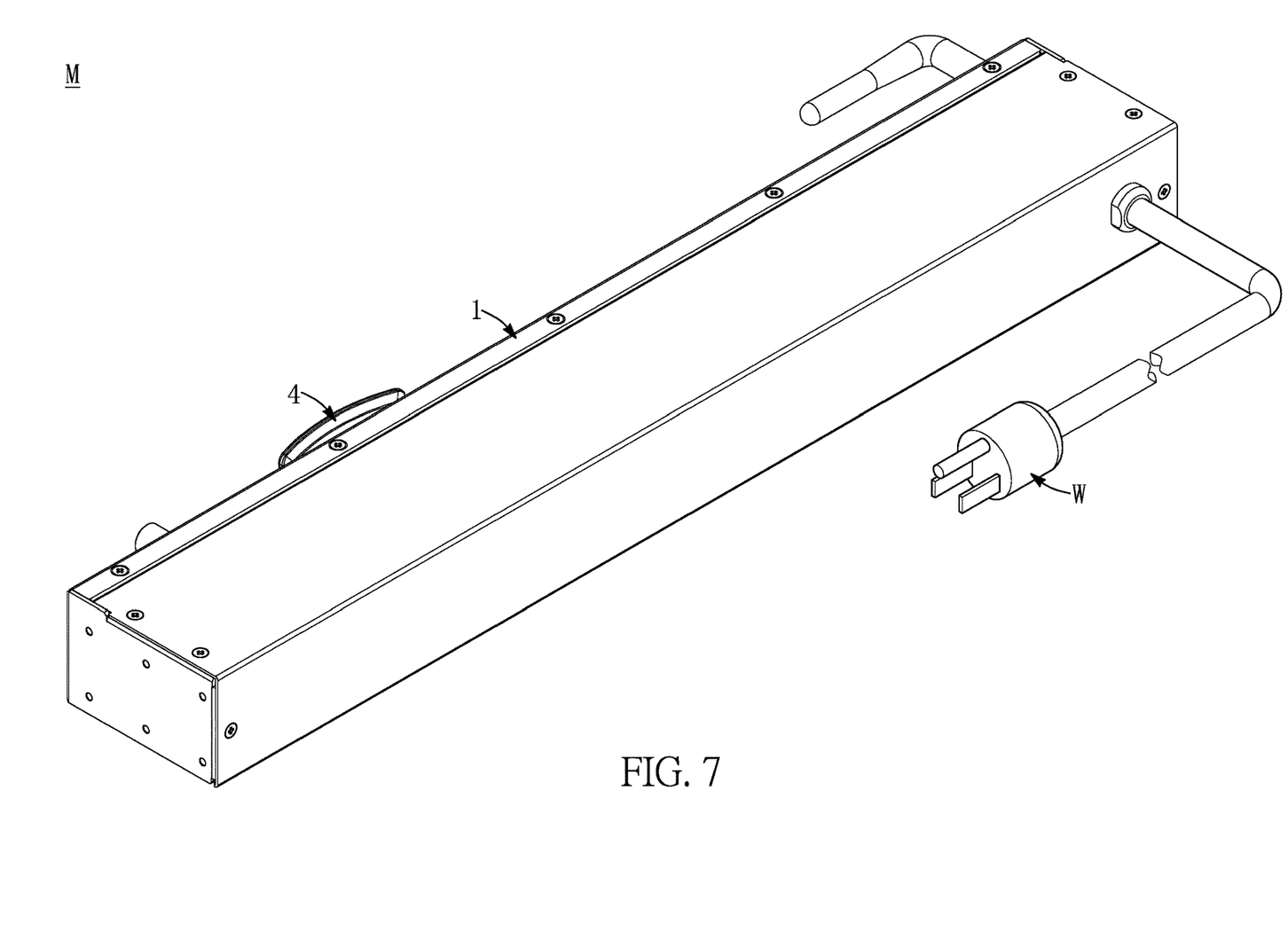
FIG. 7 is another schematic perspective view of the surge protection system according to the second embodiment of the present disclosure.

Referring to FIG. 1, FIG. 3, and FIG. 4, FIG. 1 is a functional block diagram of a surge protection system according to the present disclosure. FIG. 3 and FIG. 4 are schematic perspective views of a surge protection system according to an embodiment of the present disclosure. An embodiment of the present disclosure provides a surge protection system M, which includes: a receptacle body 1, at least one power obtaining device, two surge protection modules 4, and a microcontroller unit (MCU) 5. In this embodiment, the at least one power obtaining device is disposed on the receptacle body 1 and connected to an electrical power. The at least one power obtaining device can include a power output jack 2 and a power input jack 3. The power input jack 3 is electrically connected to an external power supply. That is, the external power supply is inserted into the power input jack 3 through an electrical connecting wire, so as to output power to the surge protection system M. However, the present disclosure does not limit the type of the at least one power obtaining device. For example, in this embodiment, the power output jack 2 and the power input jack 3 of the at least one power obtaining device can be directly formed on the receptacle body 1. Reference can be further made to FIG. 6 and FIG. 7 for another embodiment. FIG. 6 and FIG. 7 are each a schematic perspective view of a surge protection system according to a second embodiment of the present disclosure, and FIG. 7 is a rear view of FIG. 6. The at least one power obtaining device can be a power cord W having a plug. The power cord W may be fixedly connected to the receptacle body 1, or the power cord W is detachably connected to the receptacle body 1 (i.e., the power cord W can be separated from the receptacle body 1). Reference can be made to FIG. 5, which shows a schematic perspective view of the surge protection module 4. The receptacle body 1 is provided with two accommodating chambers 11. The two surge protection modules 4 are respectively and detachably disposed in the two accommodating chambers 11, and are electrically connected between the power input jack 3 and the at least one power output jack 2. Moreover, the power input jack 3 is also electrically connected to the at least one power output jack 2. Therefore, the external power supply outputs power to the surge protection system M through the power input jack 3, and then transmits the power to each electrical appliance connected to the at least one power output jack 2 on the receptacle body 1. Referring to FIG. 1, it should be noted that the external power supply in the present disclosure is electrically connected to the surge protection module 4 of the receptacle body 1 through the power input jack 3, but the present disclosure is not limited thereto. The external power supply can directly provide the power to the surge protection module 4 without the power input jack 3. In the embodiment of the present disclosure, the at least one power output jack 2 is plural in number, but the present disclosure is not limited to the number of the power output jacks 2. For example, as shown in FIG. 3 and FIG. 4, the surge protection system M may be a multi-hole extension socket suitable for alternating current (AC) transmission. Alternatively, in addition to the power input jack 3 and multiple power output jacks 2, the surge protection system M may be further provided with a USB jack and a network cable jack. That is, the surge protection system M may be a HUB (referring to FIG. 6). However, the present disclosure is not limited to the above-mentioned example of the multi-hole extension socket suitable for AC transmission. Sockets suitable for USBs and network cable jacks or those suitable for direct current (DC) transmission can also be used.

Figure 2:
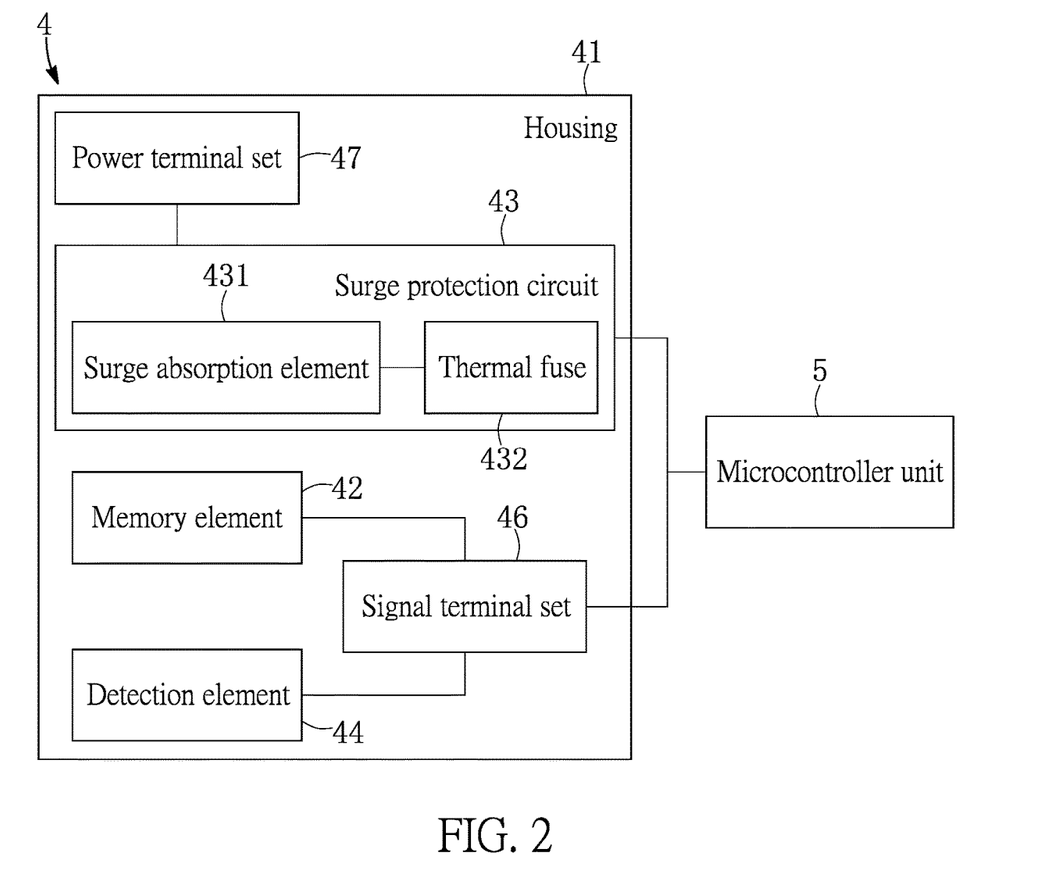
FIG. 2 is a functional block diagram of a surge protection module of the surge protection system according to the present disclosure.

Referring to FIG. 1 and FIG. 2, FIG. 2 is a functional block diagram of a surge protection module of the surge protection system according to the present disclosure. Each surge protection module 4 includes a housing 41, and a memory element 42 and a surge protection circuit 43 disposed in the housing 41. The memory element 42 stores identification information of each surge protection module 4, but is not limited to a factory serial number. The surge protection circuit 43 includes a surge absorption element 431 and a thermal fuse 432. The surge absorption element 431 is electrically connected in series to the thermal fuse 432. The surge absorption element 431 can be, for example, a metal oxide varistor (MOV), but is not limited thereto. The memory element 42 can be a FLASH or an electrically erasable programmable read-only memory (EEPROM). The surge absorption element 431 can absorb a surge inputted from the external power supply through the power input jack 3. The memory element 42 is configured to record a number of surges carried by the surge absorption element 431. Thus, through the memory element 42 recording the identification information of each surge protection module 4 and a usage status of the surge absorption element 431, the occurrence of a situation where data of the surge protection modules 4 is reset or zeroed due to power failure can be prevented. Moreover, the surge protection system M further includes a surge detection circuit 6 configured to detect absorption of the surge by the surge absorption element 431. The surge detection circuit 6 can be an independent element, which is electrically connected between the at least one surge protection module 4 and the microcontroller unit 5. However, the present disclosure is not limited thereto. The surge detection circuit 6 can also be disposed inside the microcontroller unit 5 or used as an internal member of the surge protection circuit 43.

Further, the surge absorption element 431 absorbs the surge to generate a temperature rise. The temperature rise refers to the temperature of an electronic element being higher than that of the external environment. When the temperature rise exceeds a temperature tolerance range of the thermal fuse 432, the thermal fuse 432 is blown, so that the surge protection circuit 43 forms an open circuit. In this way, a current is prevented from continually flowing through the surge absorption element 431 and causing damage thereto.

In addition, each surge protection module 4 further includes a detection element 44. The detection element 44 is electrically connected to the microcontroller unit 5. The detection element 44 is mainly configured to detect a module state inside the surge protection module 4, and to output a detection signal to the microcontroller unit 5 accordingly. The module state includes a gas pressure value, a temperature value, a humidity value, a current value, a voltage value, and an impedance value in the at least one surge protection module 4. In other words, the detection element 44 can include multiple sensors, such as a pressure sensor, a humidity sensor, a current sensor, a voltage sensor, or an impedance sensor. The sensors are configured to detect different parameter values in the surge protection module 4, respectively. For example, the pressure sensor can be a capacitive type pressure transducer or a force sensitive resistor commonly available on the market. A magnitude of pressure can be sensed through changes in capacitance or resistance on the sensor. The humidity sensor can be a humidity sensitive resistor or a humidity sensitive capacitance, which is configured to sense humidity through the changes in capacitance or resistance on the sensor. The current sensor can be a current transformer or a Hall current sensor that reads a current by using a voltage drop across the sensor. The voltage sensor can be an amplifier IC element that is configured to measure a voltage value outputted by an element to be detected. The impedance sensor can be an eddy current sensor. Naturally, the present disclosure is not limited thereto.

In continuation of the above, the microcontroller unit 5 is disposed in the receptacle body 1. It should be noted that the microcontroller unit 5 is an independent element independent of the surge protection module 4. That is, the microcontroller unit 5 and the surge protection module 4 are two independent elements. Specifically, the microcontroller unit 5 and the surge protection module 4 are both electrically connected to a circuit board in the receptacle body 1 but are not limited to a same circuit board (i.e., the microcontroller unit 5 and the surge protection module 4 can also be electrically connected to different circuit boards in the receptacle body 1). Further, the microcontroller unit 5 is electrically connected to the memory element 42 and the surge absorption element 431. When a surge enters the surge protection system M from the external power supply through the power input jack 3, the surge absorption element 431 absorbs the surge, and the surge detection circuit 6 outputs a signal to the microcontroller unit 5 accordingly. According to the signal, the microcontroller unit 5 reads the identification information of the surge protection module 4 stored in the memory element 42 and performs a comparison and identifies an identity of the surge protection module 4, so as to detect whether the surge protection module 4 is installed correctly and operable. Then, according to the signal, the microcontroller unit 5 further calculates the number of surges carried by the surge absorption element 431 and records the number of surges in an internal memory (such as, but not limited to, a static random access memory (SRAM) and a FLASH) of the microcontroller unit 5. Alternatively, the microcontroller unit 5 can also record the number of surges in the memory element 42. In addition, according to the signal, the microcontroller unit 5 further calculates a magnitude of surge energy carried by the surge absorption element 431, and records the surge energy in the internal memory of the microcontroller unit 5 or in the memory element 42. Specifically, when the detection element 44 is configured to detect the module state of the at least one surge protection module 4 and outputs the detection signal to the microcontroller unit 5 accordingly, the microcontroller unit 5 further detects temperature and humidity values in the surge protection module 4 according to the signal, and records said values in the internal memory of the microcontroller unit 5 or in the memory element 42. More specifically, according to the signal, the microcontroller unit 5 can further detect the current value, the voltage value, the impedance value, and/or the gas pressure value in the surge protection module 4, so as to determine a service life of the surge absorption element 431. The current value, the voltage value, the impedance value, and/or the gas pressure value are recorded in the internal memory of the microcontroller unit 5 or in the memory element 42.

In addition, it should be noted that in this embodiment, when the number of the surge protection module 4 is two or more and the number of the accommodating chamber 11 is two or more, each of the surge protection modules 4 has one of a plurality of starting voltages, and the starting voltages of two of the surge protection modules 4 have different voltage values. When the number of the surge protection module 4 is two or more and the number of the accommodating chamber 11 is two or more, each of the surge protection modules 4 has one of a plurality of starting voltages, the starting voltages of two of the surge protection modules 4 have voltage values that are the same, and a switching circuit (not shown) is provided between the two starting voltages. For example, when the number of the surge protection module 4 is two, the two surge protection modules 4 each have the starting voltage (or called a surge suppression starting voltage), and the voltage values of the two starting voltages can be equal or not equal. To be more specific, when the voltage values of the starting voltages of the two surge protection modules 4 are not equal (that is, the voltage value of one starting voltage is small while the voltage value of another starting voltage is large), the surge protection module 4 with the small starting voltage value is more susceptible to an impact of the surge than the surge protection module 4 with the large starting voltage value. In this way, when the surge protection module 4 with the small starting voltage value is damaged as a result of carrying too many surges, the surge protection module 4 with the large starting voltage value can be ensured to continue maintaining a normal operation. When the voltage values of the starting voltages of the two surge protection modules 4 are equal, the two surge protection modules 4 have circuits that are separate and independent of each other. Further, a switching circuit (not shown) is provided between the two surge protection modules 4, and the switching circuit is disposed on the circuit board. When one surge protection module 4 is damaged as a result of carrying too many surges, another surge protection module 4 continues to operate through switching of the switching circuit, so that the surge protection system M and an electrical appliance connected thereto continue to be protected from the surges. Accordingly, the surge protection system M and the electrical appliance connected thereto will not be unprotected from the surges due to one of the surge protection modules 4 being damaged and not replaced in time.

Referring to FIG. 2, the surge protection module 4 further includes a signal terminal set 46 and a power terminal set 47. The signal terminal set 46 includes multiple signal terminals, and the power terminal set 47 includes multiple power terminals. The signal terminal set 46 is configured to transmit DC signals between the memory element 42 and the microcontroller unit 5, and between the detection element 44 and the microcontroller unit 5. The power terminal set 47 is configured to be electrically connected to the external power supply and transmit an AC signal to the surge absorption element 431. In addition, the power terminal set 47 can include an AC/DC conversion circuit (not shown). In this way, after the power terminal set 47 is electrically connected to the external power supply, AC power can be converted into DC power through the AC/DC conversion circuit and then supplied to the memory element 42 and the detection element 44. Then, the DC power is transmitted by the signal terminal set 46 to the microcontroller unit 5 that is outside the surge protection module 4. It should be noted that the specific position of the AC/DC conversion circuit is not limited in the present disclosure. The AC/DC conversion circuit can be disposed in the surge protection module 4, and can also be disposed outside the surge protection module 4 (i.e., disposed on the circuit board). When the AC/DC conversion circuit is disposed outside the surge protection module 4, the memory element 42, the detection element 44, and the microcontroller unit 5 can directly obtain the DC power through the AC/DC conversion circuit and without going through the surge protection module 4. In addition, in other embodiments, the microcontroller unit 5 can also be disposed inside the surge protection module 4. In this case, after external power is introduced into the power terminal set 47, the AC power is converted into the DC power through the AC/DC conversion circuit and then supplied to the microcontroller unit 5 inside the surge protection module 4. In addition, the arrangement positions and types of the signal terminal set 46 and the power terminal set 47 are also not limited in the present disclosure. In this embodiment, the signal terminals in the signal terminal set 46 are in the shape of a needle-like pin, and the power terminals in the power terminal set 47 are in the shape of a sheet-shaped insert. That is, the signal terminal set 46 and the power terminal set 47 are arranged in different areas and are of different types. However, in other embodiments, the signal terminal set 46 and the power terminal set 47 can also be arranged together and of a same type. For example, the signal terminal set 46 can also be in the shape of a sheet-shaped insert as the power terminal set 47, and the signal terminal set 46 and the power terminal set 47 can be arranged in a same area.

Second Embodiment

Referring to FIG. 1, FIG. 6, FIG. 7, and FIG. 8, FIG. 8 is a schematic perspective view of a surge protection module and an accommodating chamber of the surge protection system according to the second embodiment of the present disclosure. Compared with the first embodiment, a surge protection system M in the second embodiment has a similar structure and a same function. The surge protection system M includes a receptacle body 1, a power obtaining device (the power obtaining device includes a power cord W having a plug), a surge protection module 4, and a microcontroller unit (MCU) 5. The receptacle body 1 is provided with an accommodating chamber 11, and the surge protection module 4 is detachedly disposed in the accommodating chamber 11 and electrically connected to the power obtaining device (i.e., the power cord W).

Figure 9:
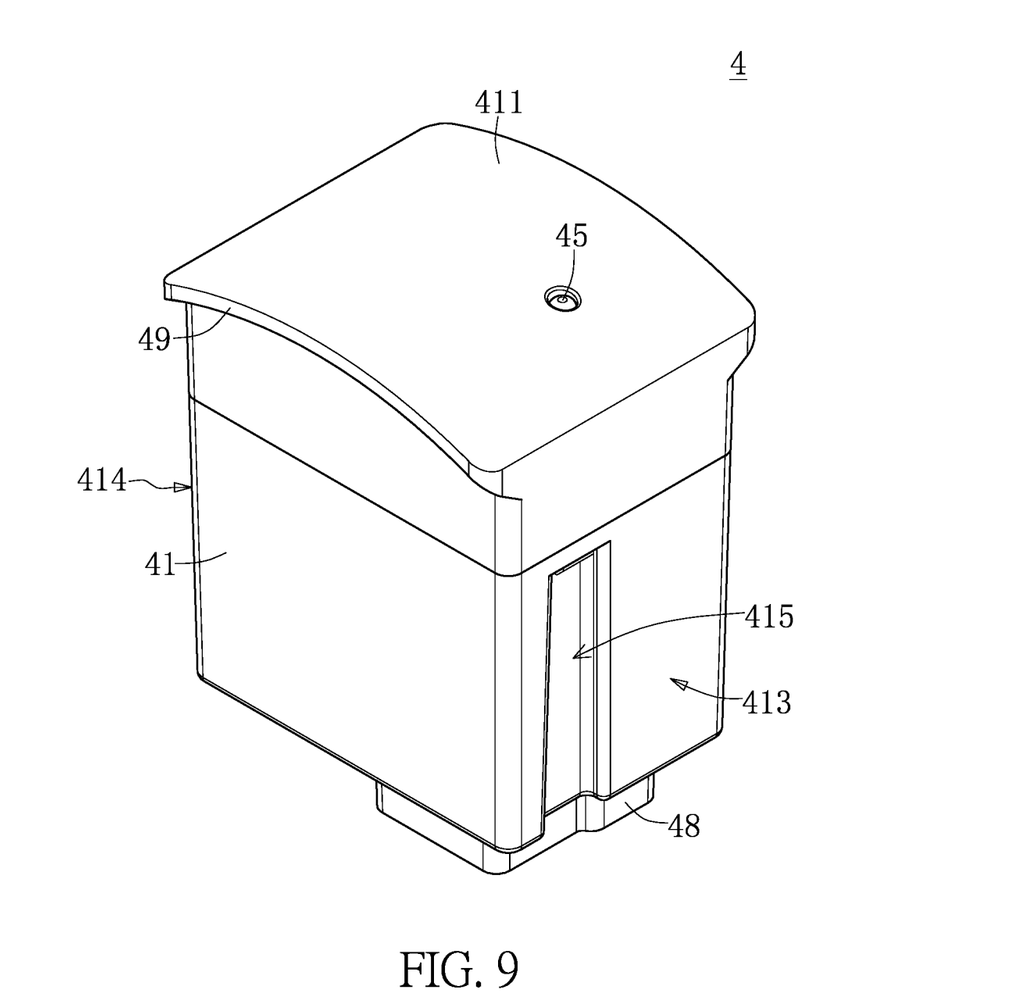
FIG. 9 is a first schematic perspective view of the surge protection module of the surge protection system according to the second embodiment of the present disclosure.
Figure 10:
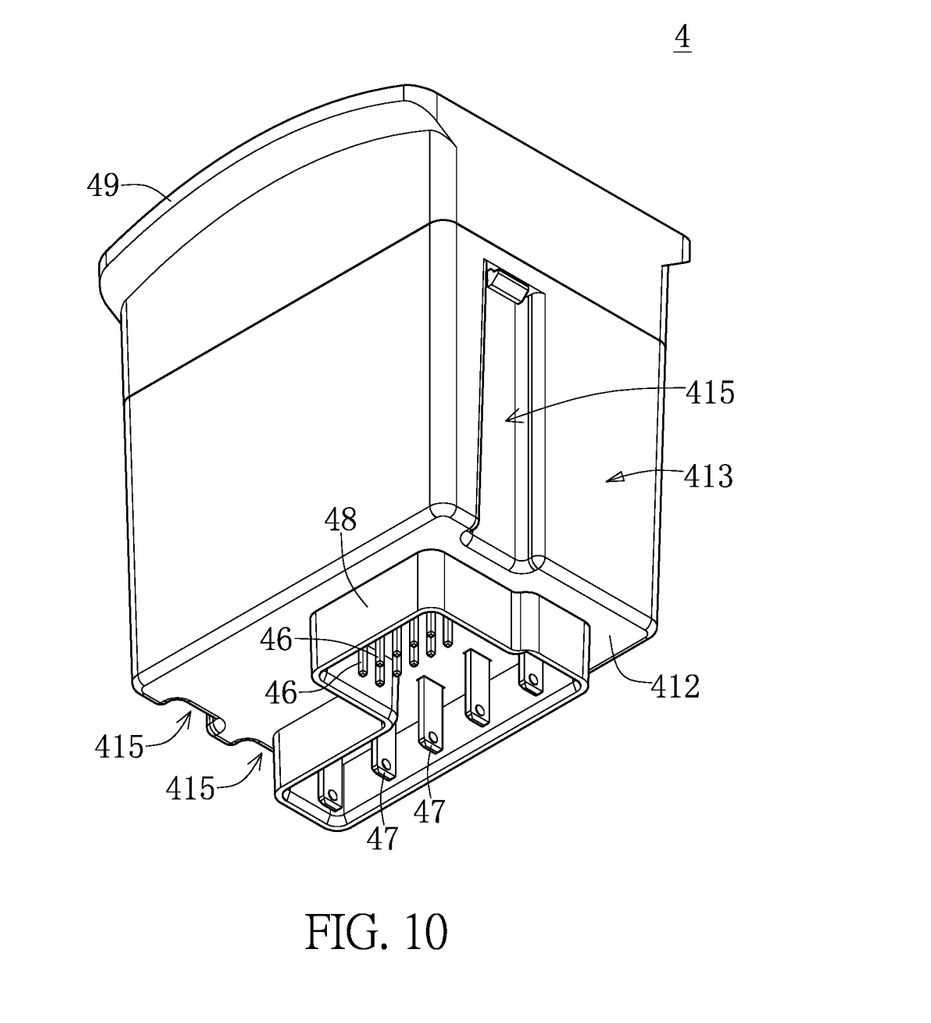
FIG. 10 is a second schematic perspective view of the surge protection module of the surge protection system according to the second embodiment of the present disclosure.

Reference is made to FIG. 2, which is to be read in conjunction with FIG. 9 and FIG. 10. FIG. 9 is a first schematic perspective view of the surge protection module of the surge protection system according to the second embodiment of the present disclosure, and FIG. 10 is a second schematic perspective view of the surge protection module of the surge protection system according to the second embodiment of the present disclosure. The surge protection module 4 includes a housing 41, and a memory element 42 and a surge protection circuit 43 disposed in the housing 41. The surge protection circuit 43 includes a surge absorption element 431 and a thermal fuse 432. The surge absorption element 431 is electrically connected in series to the thermal fuse 432. Moreover, the surge protection module 4 further includes a signal terminal set 46 and a power terminal set 47. The signal terminal set 46 is electrically coupled to the memory element 42 and is exposed from the housing 41. The power terminal set 47 is electrically coupled to the surge absorption element 431 and is exposed from housing 41. The housing 41 includes a first housing wall 411, a second housing wall 412, a third housing wall 413, and a fourth housing wall 414. The first housing wall 411 and the second housing wall 412 are respectively located on two opposite sides of the housing 41, the third housing wall 413 and the fourth housing wall 414 are also respectively located on two opposite sides of the housing 41, and the first housing wall 411 and the second housing wall 412 are respectively connected between the third housing wall 413 and the fourth housing wall 414. The surge protection module 4 further includes a terminal protection member 48 and an extraction member 49. The extraction member 49 is disposed on the first housing wall 411 of the housing 41. Further, the extraction member 49 is a curved wall formed above the housing 41, and the curved wall extends to two sides of the housing 41 to form two flanges. Thus, when a user pulls out the surge protection module 4 from the accommodating chamber 11, the user can directly clamp the extraction member 49 with his/her fingers and pull out the extraction member 49 from the accommodating chamber 11. In other words, the extraction member 49 is actually an easy-to-take-out structure. However, the structure of the extraction member 49 is not limited in the present disclosure. For example, in the first embodiment, the extraction member 49 is a handle, which can also be clamped by the user and be pulled out from the accommodating chamber 11. The terminal protection member 48 is disposed on the second housing wall 412 of the housing 41, and the terminal protection member 48 surrounds the signal terminal set 46 and the power terminal set 47. Moreover, a height of the terminal protection member 48 (the height is calculated from a surface of the first housing wall 411) is not lower than a height of a portion of the signal terminal set 46 or the power terminal set 47 exposed from the housing 41. The terminal protection member 48 can protect the signal terminal set 46 and the power terminal set 47 from bending due to side collisions. The terminal protection member 48 also has a guiding function, so that the signal terminal set 46 and the power terminal set 47 can be correctly inserted into corresponding terminal holes (not shown).

Reference is further made to FIG. 2 and FIG. 3, which are to be read in conjunction with FIG. 9 and FIG. 10. The surge protection module 4 further includes a detection element 44 and a display element 45. The detection element 44 and the display element 45 are electrically connected to the microcontroller unit 5 and the surge absorption element 431. The detection element 44 is configured to detect a module state inside the surge protection module 4, and to output a detection signal to the microcontroller unit 5 accordingly. The display element 45 is mainly configured to display whether the surge absorption element 431 is functioning or if there is a failure or malfunction. However, the microcontroller unit 5 can provide an operation signal to the display element 45 according to the detection signal, so that the display element 45 can send out a warning message to warn the user. Preferably, the display element 45 can be an LED lamp or a display screen. The warning message can be, for example, but not limited to, a light, a sound, or a text message. In addition, the arrangement position and type of the display element 45 are not limited in the present disclosure. When the display element 45 is an LED lamp, the display element 45 can be disposed on the first housing wall 411 of the housing 41 (as shown in FIG. 9). When the display element 45 is a display screen, the display element 45 can be disposed on the receptacle body 1 (as shown in FIG. 3).

Figure 11:
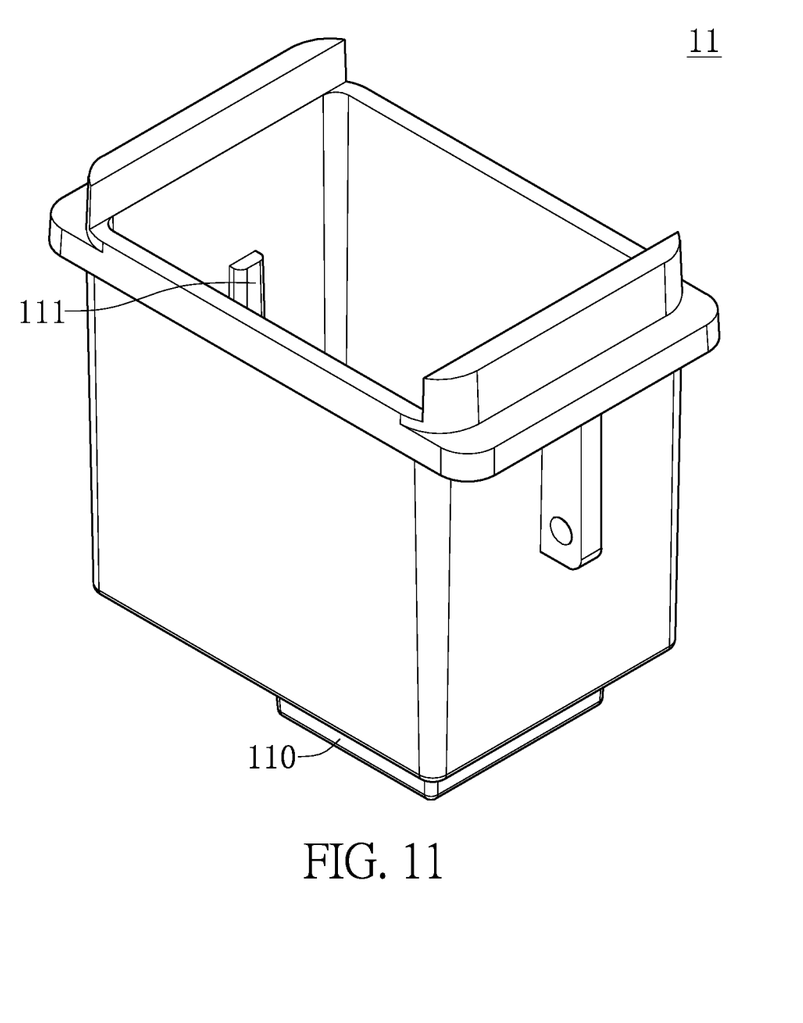
FIG. 11 is a schematic perspective view of the accommodating chamber of the surge protection system according to the second embodiment of the present disclosure.
Figure 12:
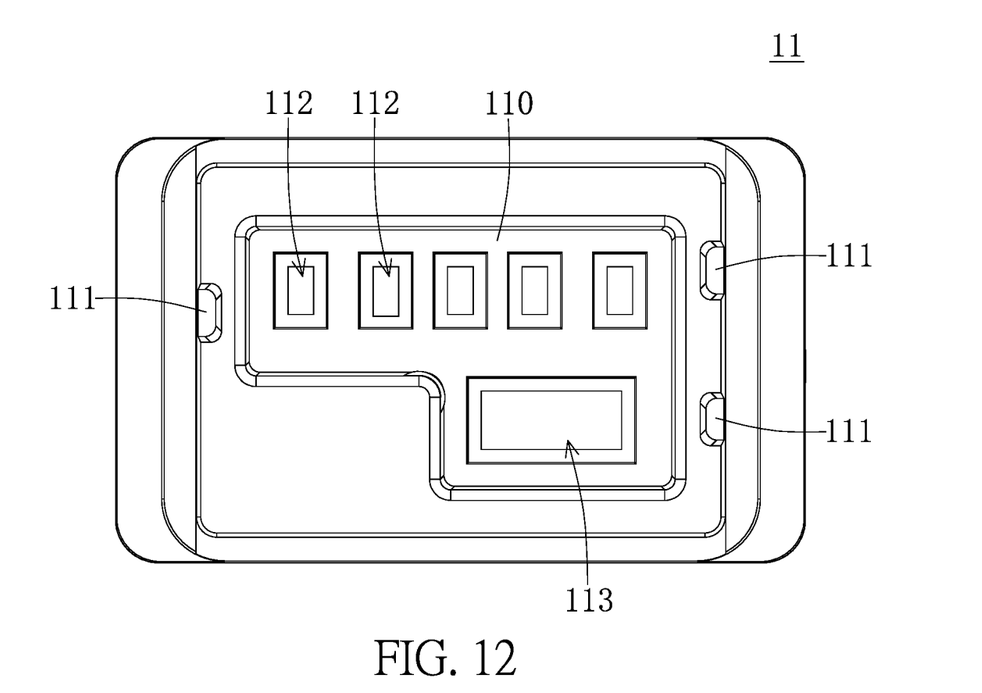
FIG. 12 is a schematic top view of the accommodating chamber of the surge protection system according to the second embodiment of the present disclosure.

Referring to FIG. 10 to FIG. 12, FIG. 11 and FIG. 12 are a schematic perspective view and a schematic top view of the accommodating chamber of the surge protection system according to the second embodiment of the present disclosure. As shown in FIG. 10, a first foolproof member 415 is formed on the third housing wall 413 of the housing 41, another two first foolproof members 415 are formed on the fourth housing wall 414, and three second foolproof members 111 corresponding to the three first foolproof members 415 are formed on an inner surface of the accommodating chamber 11. Specifically, the first foolproof member 415 can be a groove formed along the third housing wall 413 and the fourth housing wall 414, and the second foolproof member 111 can be a protrusion formed along the third housing wall 413 and the fourth housing wall 414. Therefore, when the surge protection module 4 is disposed in the accommodating chamber 11, each of the first foolproof members 415 is snap-fitted to the corresponding second foolproof member 111. Through the structural design of the first foolproof members 415 and the second foolproof members 111, the user can be prevented from placing the surge protection module 4 into the accommodating chamber 11 in a wrong insertion direction.

Figure 8:
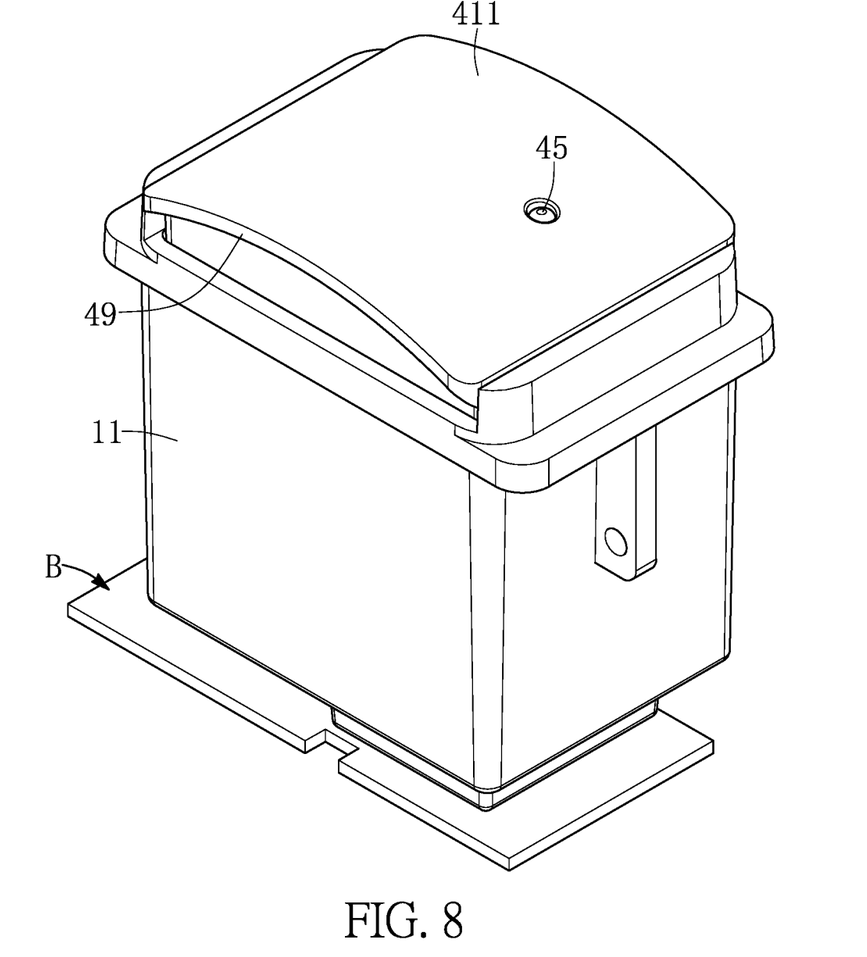
FIG. 8 is a schematic perspective view of the surge protection module and an accommodating chamber of the surge protection system according to the second embodiment of the present disclosure.

In addition, as shown in FIG. 12, a recess 110 is formed in the second housing wall 412 inside the accommodating chamber 11, and multiple first slots 112 and a second slot 113 are formed in the recess 110. It is worth mentioning that a contour of the recess 110 is formed to correspond to a contour of the terminal protection member 48. Therefore, when the surge protection module 4 is placed in the accommodating chamber 11, the terminal protection member 48 is snap-fitted into the recess 110. Moreover, the signal terminal set 46 is correspondingly inserted into the second slot 113 to be exposed from the accommodating chamber 11, and the power terminal set 47 is correspondingly inserted into the first slots 112 to be exposed from the accommodating chamber 11. Thus, the signal terminal set 46 and the power terminal set 47 that are exposed from the accommodating chamber 11 can be electrically connected to a circuit board B (as shown in FIG. 8).

Beneficial Effects of the Embodiments

In conclusion, in the surge protection system M provided by the present disclosure, through the technical features of "the at least one surge protection module 4 is detachably disposed in the at least one accommodating chamber 11 and electrically connected to the power obtaining device," "the memory element 42 stores identification information of the at least one surge protection module 4," and "when the surge enters the surge protection system M from the external power supply through the power obtaining device, the surge absorption element 431 absorbs the surge and outputs a signal to the microcontroller unit 5 accordingly, and the microcontroller unit 5 records, according to the signal, the number of surges and the magnitude of surge energy carried by the surge absorption element 431, and the temperature value and the humidity value in the at least one surge protection module 4," the at least one surge protection module 4 can be used as an independent element that can be separated from the surge protection system M, and can be replaced separately when the at least one surge protection module 4 is damaged.

Furthermore, the detection element 44 is configured to detect a module state inside the at least one surge protection module 4, and to output a detection signal to the microcontroller unit 5 accordingly. The microcontroller unit 5 can provide an operation signal to the display element 45 according to the detection signal, so that the display element 45 can send out a warning message to warn the user. In addition, through the memory element 42 recording the identification information of the at least one surge protection module 4 and a usage status of the surge absorption element 431, the occurrence of a situation where data of the at least one surge protection module 4 is reset or zeroed due to power failure can be prevented.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A surge protection system, comprising:
   a receptacle body provided with at least one accommodating chamber;
   a power obtaining device disposed on the receptacle body and connected to an electrical power;
   at least one surge protection module detachably disposed in the at least one accommodating chamber and electrically connected to the power obtaining device, wherein the at least one surge protection module includes:
      a housing;
      a memory element disposed in the housing, wherein the memory element stores identification information of the at least one surge protection module;
      a surge protection circuit disposed in the housing, wherein the surge protection circuit includes a surge absorption element and a thermal fuse, the surge absorption element is electrically connected in series to the thermal fuse, the surge absorption element is configured to absorb a surge inputted from an external power supply through the power obtaining device, and the surge absorption element absorbs the surge to generate a temperature rise; wherein, when the temperature rise exceeds a temperature tolerance range of the thermal fuse, the thermal fuse is blown, so that the surge protection circuit forms an open circuit;
      a display element electrically connected to the surge absorption element, wherein the display element is configured to display whether the surge absorption element is in an operational status or a failed status;
      a signal terminal set electrically coupled to the memory element and exposed from the housing; and
      a power terminal set electrically coupled to the surge absorption element and exposed from the housing; and
   a microcontroller unit disposed in the receptacle body, wherein the microcontroller unit is electrically connected to the memory element and the surge protection circuit.

2. The surge protection system according to claim 1, wherein, according to a signal, the microcontroller unit writes a number of surges and a magnitude of surge energy carried by the surge absorption element, and a temperature value and a humidity value in the at least one surge protection module into the memory element.

3. The surge protection system according to claim 2, wherein the microcontroller unit is configured to read the number of surges carried by the surge absorption element and the identification information of the at least one surge protection module accessed by the memory element.

4. The surge protection system according to claim 1, wherein, when a number of the surge protection module is two or more and a number of the accommodating chamber is two or more, each of the surge protection modules has one of a plurality of starting voltages, and the starting voltages of two of the surge protection modules have different voltage values.

5. The surge protection system according to claim 1, wherein, when a number of the surge protection module is two or more and a number of the accommodating chamber is two or more, each of the surge protection modules has one of a plurality of starting voltages, the starting voltages of two of the surge protection modules have voltage values that are the same, and a switching circuit is provided between the two starting voltages.

6. The surge protection system according to claim 1, wherein the at least one surge protection module further includes a detection element, and the detection element is electrically connected to the microcontroller unit; wherein the detection element is configured to detect a module state of the at least one surge protection module, and to output a detection signal to the microcontroller unit accordingly; wherein, according to the detection signal, the microcontroller unit records a temperature value and a humidity value in the at least one surge protection module.

7. The surge protection system according to claim 6, wherein the module state includes a gas pressure value, the temperature value, the humidity value, a current value, a voltage value, and an impedance value in the at least one surge protection module.

8. The surge protection system according to claim 1, wherein the display element is electrically connected to the microcontroller unit, and the display element is configured to display a number of surges that the surge absorption element has received or a remaining service life of the surge absorption element.

9. The surge protection system according to claim 1, further comprising: a surge detection circuit electrically connected between the at least one surge protection module and the microcontroller unit, the surge detection circuit being configured to detect absorption of the surge by the surge absorption element, wherein, when the surge enters the surge protection system from the external power supply through the power obtaining device, the surge absorption element is configured to absorb the surge, and the surge detection circuit outputs a signal to the microcontroller unit accordingly; wherein, according to the signal, the microcontroller unit records a number of surges or a magnitude of surge energy carried by the surge absorption element.

10. The surge protection system according to claim 1, wherein the power terminal set includes an alternating current (AC)/direct current (DC) conversion circuit, and the AC/DC conversion circuit is configured to convert AC power passing through the power terminal set into DC power.

11. The surge protection system according to claim 1, wherein the at least one surge protection module further includes an extraction member, and the extraction member is disposed on a first housing wall of the housing.

12. The surge protection system according to claim 11, wherein the at least one surge protection module further includes a terminal protection member, the terminal protection member is disposed on a second housing wall of the housing, the terminal protection member surrounds the signal terminal set and the power terminal set, and a height of the terminal protection member is not lower than a height of a portion of the signal terminal set or the power terminal set exposed from the housing.

13. The surge protection system according to claim 12, wherein at least one first foolproof member is formed on a third housing wall of the housing, and at least one second foolproof member that corresponds to the at least one first foolproof member is formed on a surface of the at least one accommodating chamber; wherein, when the at least one surge protection module is disposed in the at least one accommodating chamber, the at least one foolproof member is snap-fitted to the corresponding at least one second foolproof member.

\* \* \* \* \*